United States Patent
Fan et al.

(10) Patent No.: US 6,870,640 B1
(45) Date of Patent: Mar. 22, 2005

(54) METHOD AND APPARATUS FOR RENDERING A CONTINUOUS TONE IMAGE REPRESENTATION WITH MULTIPLE DIGITAL HALFTONING

(75) Inventors: Zhigang Fan, Webster, NY (US); Shen-Ge Wang, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 879 days.

(21) Appl. No.: 09/713,940

(22) Filed: Nov. 16, 2000

(51) Int. Cl.[7] .......................... G06K 15/00; G06K 9/36
(52) U.S. Cl. .................. 358/3.02; 358/3.06; 382/237
(58) Field of Search .................. 382/254, 252, 382/100, 237; 358/1.9, 456, 3.02, 3.06, 3.1, 3.23, 3.27, 3.3

(56) References Cited

U.S. PATENT DOCUMENTS

| | | | |
|---|---|---|---|
| 5,673,121 A | 9/1997 | Wang | 358/456 |
| 5,805,734 A | 9/1998 | Ebner | 382/237 |
| 5,835,687 A * | 11/1998 | Brown et al. | 358/1.9 |
| 6,026,199 A * | 2/2000 | Sommer | 382/252 |
| 6,363,177 B1 * | 3/2002 | Loce et al. | 382/254 |
| 6,694,041 B1 * | 2/2004 | Brunk | 382/100 |

* cited by examiner

Primary Examiner—Jerome Grant II
(74) Attorney, Agent, or Firm—Fay, Sharpe, Fagan, Minnich & McKee, LLP

(57) ABSTRACT

A system for rendering an image representation is disclosed. The system includes a halftone processor; a printer interfaced to the halftone processor; and a software routine operative on the halftone processor for a) classifying an input pixel value in either a first classification or a second classification, b) determining an output pixel value by error diffusing the input pixel value when the input pixel value is classified in the first classification, c) determining a temporary output pixel value by stochastic screening the input pixel value when the input pixel value is classified in the second classification, d) determining an adjusted input pixel value based on the input pixel value, the temporary output pixel value and a weighting value, e) determining the output pixel value by error diffusing the adjusted input pixel value, and f) rendering the output pixel value in the printer.

19 Claims, 4 Drawing Sheets

METHOD AND APPARATUS FOR RENDERING A CONTINUOUS TONE IMAGE REPRESENTATION WITH MULTIPLE DIGITAL HALFTONING

BACKGROUND OF THE INVENTION

The present invention relates to the digital imaging art. It finds particular application in conjunction with a method and apparatus for rendering a continuous tone (a.k.a. contone) image representation with multiple digital halftoning techniques, and will be described with particular reference thereto.

In the digital reproduction of documents, an image is conveniently represented as a bitmap, which may be described as an electronic image with discrete signals (hereinafter, pixels) defined by position and density. In such a system, density is described as one level in a number of possible states or levels. When more than two levels of density are used in the description of the image, the levels are often termed "gray", indicating that they vary between a maximum and minimum, and without reference to their actual color.

Most printing systems have the ability to reproduce an image with a small number of levels, most commonly two, although other numbers are possible. Common input devices including document scanners, digital cameras and the computer imagery generators, however, are capable of describing an image with a substantially larger number of gray levels, with 256 levels a commonly selected number, although larger and smaller levels are possible. It is required that an image initially described at a large set of levels also be describable at a smaller set of levels, in a manner which captures the intent of the user.

For color images, a plurality of bitmaps, each forming a color separation are combined. Each color separation may be defined by a number of gray levels in excess of the capability of the printer. In digital reproduction of color documents, each of the color separations is reduced from the input number of levels to a smaller output number of levels. The multiple color separations are combined together at printing to yield the final color print. Commonly, color documents are formed using cyan, magenta and yellow colorants or cyan, magenta, yellow and black colorants. A larger number or alternative colorants may also be used.

In printing digital image representations of a contone image, the desired density over an area is commonly achieved by halftoning, where image density variation is represented by placing greater or less numbers of ON pixels in a discrete area of the image. One digital halftoning technique for reproducing a contone image representation is error diffusion. Error diffusion attempts to maintain gray by making the conversion from gray pixels to binary or other level pixels on a pixel-by-pixel basis. That is, each pixel is examined with respect to a threshold, and the difference between the gray level pixel value and the output value is forwarded to a selected group or set of neighboring pixels, in accordance with a weighting scheme. Error diffusion usually produces halftones with decent overall image quality. However, it also introduces artifacts such as "worms" and periodic patterns. The worm artifacts depend on input values, and generally occur at the highlight and shadow regions. The periodic patterns are most severe when the input values happen to be a simple fraction of the output range, e.g. ½×255, ⅓×255, ⅔×255, etc.

Another digital halftoning technique for reproducing a contone image representation is stochastic screening. In U.S. Pat. No. 5,673,121 by Shen-Ge Wang (a co-inventor of the present application), an idealized stochastic screen is characterized by having all of the predominant color dots (black or white) uniformly distributed. A process is described to approach this optimization by iteratively selecting pairs of threshold levels in the screen matrix, and measuring the approach to the idealized stochastic screen. The threshold values are then swapped in position to determine whether the swap improves the measurement or not. If it does, the swap is maintained. The process is iterated until the desired result is obtained. Stochastic screening typically creates excellent halftones at the highlights and shadows. It can also avoid periodic patterns. However, stochastic screened halftones have relatively higher overall noise levels and lack the inherent edge enhancement typically provided by error diffusion.

Accordingly, it is considered desirable to develop a new and improved method and apparatus for rendering a continuous tone image representation with multiple digital halftoning techniques, that meets the above-stated needs and overcomes the foregoing difficulties and others while providing better and more advantageous results.

SUMMARY OF THE INVENTION

In accordance with one aspect of the present invention, a system for rendering an image representation is disclosed. The system includes a halftone processor; a printer interfaced to the halftone processor; and a software routine operative on the halftone processor for a) classifying an input pixel value in either a first classification or a second classification, b) determining an output pixel value by error diffusing the input pixel value when the input pixel value is classified in the first classification, c) determining a temporary output pixel value by stochastic screening the input pixel value when the input pixel value is classified in the second classification, d) determining an adjusted input pixel value based on the input pixel value, the temporary output pixel value and a weighting value, e) determining the output pixel value by error diffusing the adjusted input pixel value, and f) rendering the output pixel value in the printer.

In accordance with another aspect of the present invention, a method for rendering an image representation is disclosed. The method includes a) classifying an input pixel value in either a first classification or a second classification; b) determining an output pixel value by error diffusing the input pixel value when the input pixel value is classified in the first classification; c) determining a temporary output pixel value by stochastic screening the input pixel value when the input pixel value is classified in the second classification; d) determining an adjusted input pixel value based on the input pixel value, the temporary output pixel value and a weighting value; e) determining the output pixel value by error diffusing the adjusted input pixel value; and f) rendering the output pixel value.

In accordance with yet another aspect of the present invention, a digital halftoning system is disclosed. The system includes a processor; a marking device interfaced to the processor; and instructions operative on the processor for generating an output pixel value to be rendered by the marking device, the output pixel value being generated by a stochastic screening routine, an error diffusion routine, or a selected combination of the stochastic screening routine and the error diffusion routine depending on an input pixel value.

An advantage of the present invention is the provision of a method and apparatus for halftoning a digital image representation that combines error diffusion and stochastic screening to provide better output image quality.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
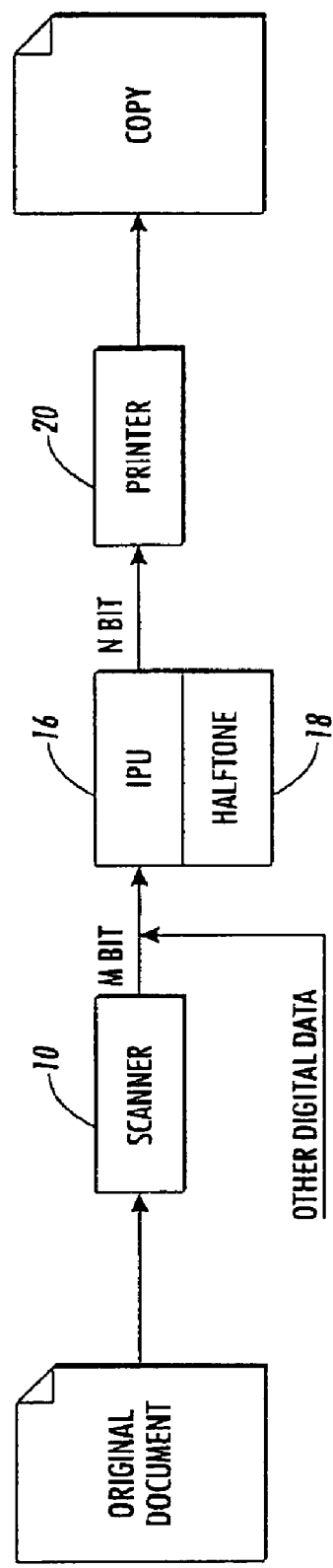
FIG. 1 is a simplified block diagram of an exemplary halftoning system in which the present invention finds use.

With reference now to FIG. 1, a basic image processing or halftoning system A is shown. In the present case, gray image data may be characterized as image signals, each pixel of which is defined at a single level or optical density in a set of (c) optical density levels (e.g. 256), the number of members in the set of levels being larger than desired. Each pixel will be processed in the manner described hereinbelow, to redefine each pixel in terms of a new, smaller set of (d) optical density levels (e.g. 2). In this process, (c) and (d) are integer values representing pixel depth, or a number of signal levels at which the pixel may appear. Thus, one common case of this method includes the conversion of data from a relatively large set of gray levels to one of two legal or allowed binary levels for printing in a binary printer.

As used herein, the term "dot pattern" refers to a product or an image resulting from a screening process. A "screen cell", as used herein, refers to the set of pixels which together will form the dot pattern, while the term "screen matrix" will be used to describe the set of values which together make up the set of threshold to be applied. A "pixel" refers to an image signal associated with a particular position in an image, having a density between white and black. Accordingly, pixels are defined by intensity and position. A dot pattern is made up of a plurality of pixels. These terms are used for simplification and it should be understood that the appropriate sizing operations have to be performed for images where the input resolution in terms of scan pixels is different from the output resolution in terms of print pixels.

The present invention can be employed in a black/white copier, such as Xerox 8830 Engineering Printer or in a typical color system where color documents are represented by multiple sets of image signals, each set (or separation) represented by an independent channel, which is usually processed more or less independently. A "color image" as used herein is therefore a document including at least two separations, such as in the Xerox 4850 Highlight Color Printer, and commonly three or four separations, such as in the Xerox 4700 Color Laser Printer, Xerox 5775 Digital Color Copier, or the Xerox 4900 printer, or sometimes more than four separations (a process sometimes called hi-fi color). One possible digital copier (a scanner/printer combination) is described for example, in U.S. Pat. No. 5,014,123, incorporated herein by reference. Each separation provides a set of image signals which will drive a printer to produce one color of the image. In the case of multicolor printers, the separations superposed together form the color image. In this context, pixels will be described as discrete image signals that represent optical density of the document image in a given small area thereof. The term "pixel" will be used to refer to such an image signal in each separation, as distinguished from "color pixel", which is the sum of the color densities of corresponding pixels in each separation. The term "gray-scale", as used herein refers to image signals or values which can vary between maximum and minimum, irrespective of the color of the separation in which the signals are used.

With continued reference to FIG. 1, an electronic image representation of an original document (hereinafter, an image) from image input terminal such as scanner 10 derives electronic digital data in some manner, in a format related to the physical characteristics of the device, and commonly with pixels defined at (m) bits per pixel. Common color scanners, such, for example, Xerox 5775 Digital Color Copiers, or the Pixelcraft 7650C, produce 8 bit/pixel data, at resolutions acceptable for many purposes. Since this is a color document, the image is defined with two or more separation bitmaps, usually with identical resolution and pixel depth. The electronic image signals are directed through an image processing unit (IPU) 16 to be processed so that an image suitable for reproduction on an image output terminal (IOT), marking engine, or printer subsection 20, is obtained. Thus, the term "printer" as used throughout refers to a separate printing device and to a subsystem of a conventional copier.

Image processing unit 16 commonly includes a halftone processor 18 which converts (m) bit digital image signals to (n) bit digital image signals, suitable for driving a particular printer, where (m) and (n) are integer values. It also well within the contemplation of the present invention, to derive images electronically. In such cases, the images may be represented by a page description language (PDL) file, describing the appearance of the page. In such a case, the IPU 16 might include processing element for decomposition of the page, and color conversions elements for providing appropriate signals for driving a printer.

Figure 2:
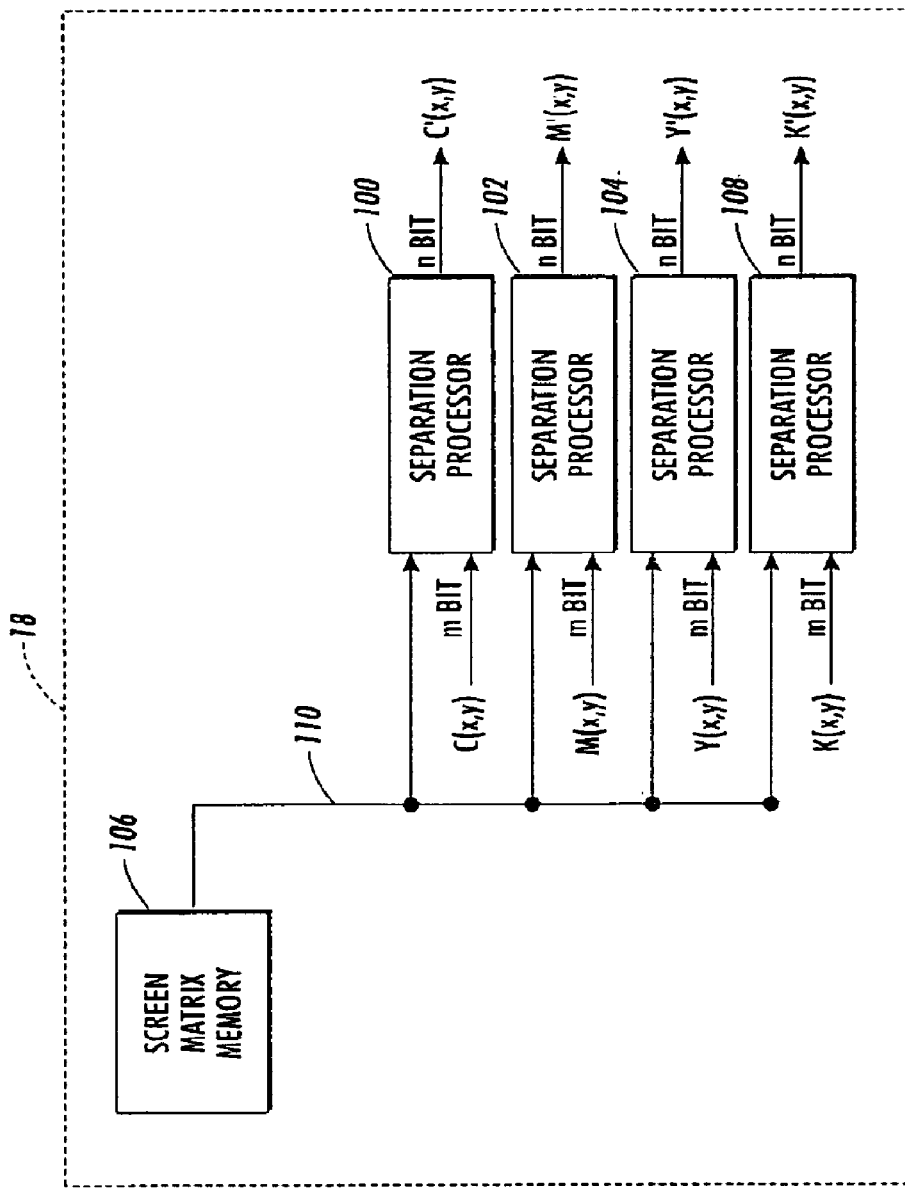
FIG. 2 is a simplified block diagram of an exemplary halftone processor associated with the halftoning system of FIG. 1.

Referring now to FIG. 2, the color halftone processor 18 uses four separations, C(x,y), M(x,y), Y(x,y), K(x,y), obtained and each processed independently for halftoning purposes, to reduce an m-bit input to an n-bit output. It will be appreciated that the invention is also applicable to the "single separation" or black and white reproduction situation as well. A source of screen matrix information, such as screen matrix memory 106, provides one input to each separation processing circuit/routine 100, 102, 104, and 108 for each separation on a line 110, where the other input to each separation processing circuit/routine is an m-bit separation bitmap pixel i(x,y), where (i) represents the gray scale input value for the respective separation C, M, Y, or K. The output is an n-bit separation bitmap pixel b(x,y), where (b) represents the binary output pixel value for the respective separation C', M', Y', or K', which can be directed to a printer 20. This illustration is highly simplified, in that distinct screen matrices may be supplied to each separation processing circuit/routine.

Figure 3:
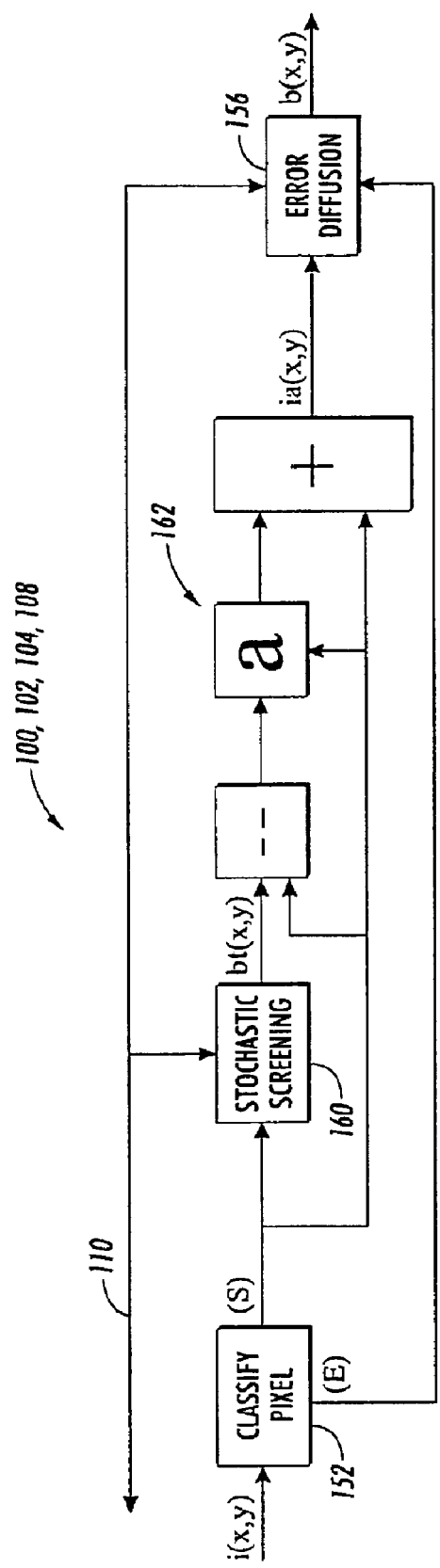
FIG. 3 is a block diagram of one separation processing circuit of the halftone processor of FIG. 2 in accordance with the present invention.
Figure 4:
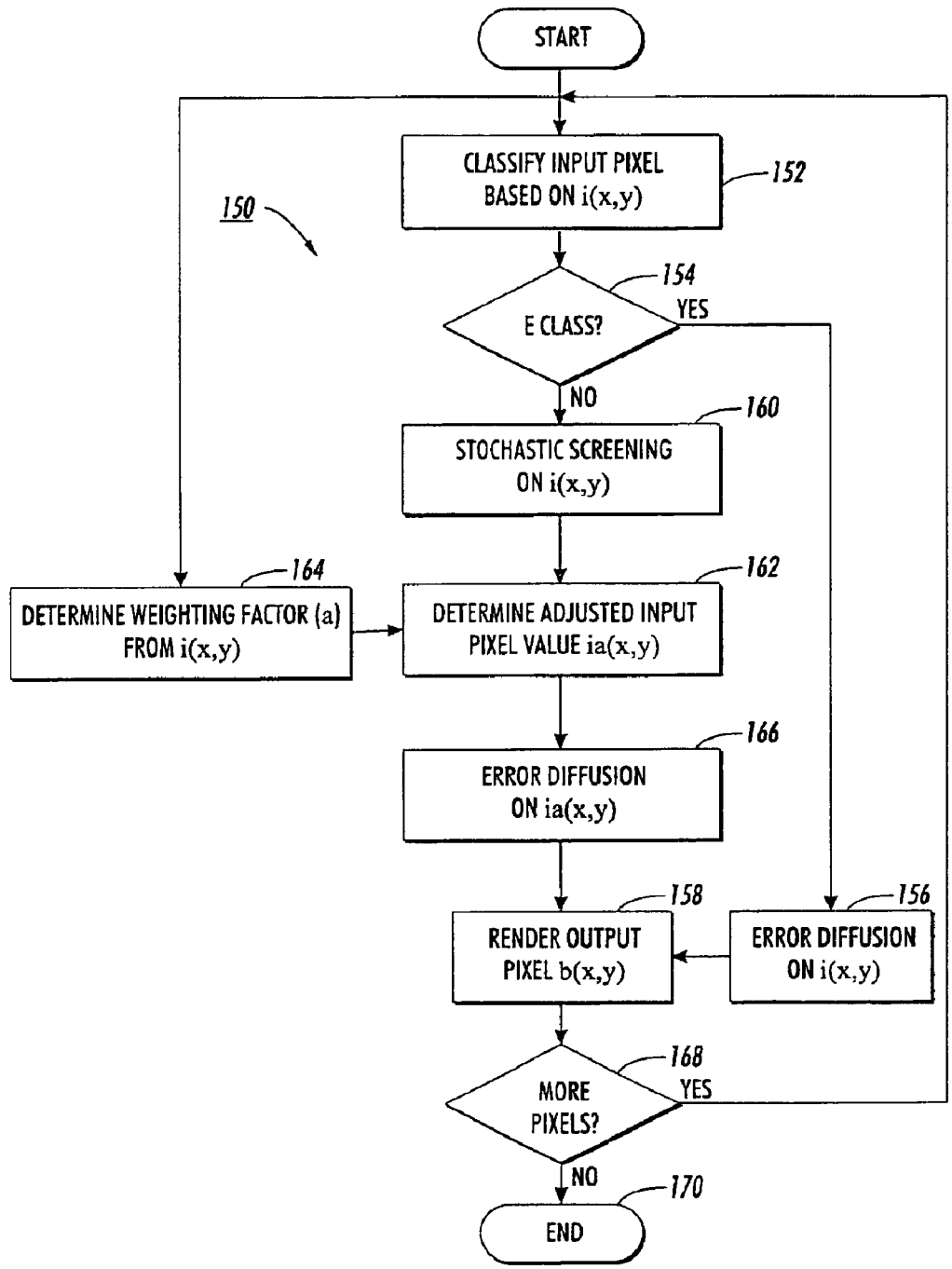
FIG. 4 is an operational flowchart for rendering a contone image representation in accordance with the present invention.

Referring now to FIGS. 3 and 4, each separation of the electronic image representation is processed within a respective one of the separation processing circuits/routines 100, 102, 104, 108 on a pixel-by-pixel basis in the same order as conventional error diffusion. The halftone rendering routine 150 starts by classifying an input pixel (x,y) into one of two classes, a stochastic screening class (S) and an error diffusion class (E), depending upon the gray scale value (i) of the input pixel being processed (x,y) (step and/or circuit 152). Gray scale values that belong to the (S) class include highlight and shadow regions. Gray scale values that cause period patterns (e.g. input values that happen to be a simple fraction of the output range, e.g. ½×255, ⅓×255, ⅔×255, etc.) also belong to the (S) class. The remainder of the gray scale values belong to the (E) class. An exemplary classification function c(i) is given by:

| | |
|---|---|
| c(i) = E | for 8 ≤ i < 78, or |
| | 93 ≤ i < 112, or |
| | 143 < i ≤ 162, or |
| | 177 < i ≤ 247 |
| c(i) = S | otherwise. |

However, it is contemplated that any conventional pixel classification scheme can be used to determine whether the input pixel belongs to the (E) class or the (S) class.

If the current input pixel being processed (x,y), belongs to the (E) class (step and/or circuit 154), then a normal error diffusion procedure is applied to the current input pixel value i(x,y) (step and/or circuit 156) to generate an output pixel value b(x,y) that is rendered by the printer 20 in a conventional manner (step 158). Otherwise, a temporary output pixel value $b_t(x,y)$ is generated using a conventional stochastic screening algorithm (step and/or circuit 160). A suitable stochastic screening technique is disclosed in the previously-mentioned U.S. Pat. No. 5,673,121 by Shen-Ge Wang, which is hereby incorporated by reference. Thus, the result of the stochastic screening step is to generate the temporary output pixel value $b_t(x,y)$ that is either ON (e.g. gray scale value that is normalized to 255) or OFF (gray scale value that is normalized to 0). Thereafter, an adjusted input pixel value $i_a(x,y)$ is determined (step and/or circuit 162) from the following equation:

$$i_a(x,y) = i(x,y) + a[b_t(x,y) - i(x,y)] \quad \text{Eq. 1}$$

where i(x,y) is the input gray scale value (0–255) for the current input pixel being processed (x,y), $b_t(x,y)$ is the temporary output pixel value generated by the stochastic screening step 160, and (a) is a weighting factor or value that varies from 0 to 1 depending upon the value of i(x,y) (step 164).

The adjustment to the input pixel value (i.e. $i_a(x,y)$) of Eq. 1 encourages error diffusion to generate the same output as the stochastic screening. The amount of encouragement depends the factor (a). That is, when (a)=1, the output of the halftoning routine 150 will be the same as stochastic screening for most reasonably designed screens. When (a)=0, the output of the halftoning routine 150 becomes ordinary error diffusion. However, when (a) is between 0 and 1, some percentage of the stochastic screened pixel replaces the pixel before the error diffusion. The factor (a) is typically a function of i(x,y). To prevent abrupt transitions (e.g. boundary effects) between adjacent gray levels, a[i(x,y)] is preferably a smooth function. An exemplary function for a(i), where (i) is the gray scale value for the input pixel (x,y), is given by:

| | |
|---|---|
| a(i) = ¾ | for i < 4; |
| a(i) = ⅛(8 − i) | for 4 ≤ i < 8; |
| a(i) = ⅛[1 − \|i − 85\|/8] | for 78 ≤ i < 93; |
| a(i) = ⅜[1 − (127 − i)/16] | for 112 ≤ i < 128; and |
| a(i) = a(255 − i) | for i > 128 |

Error diffusion is then performed to produce the output pixel value b(x,y), using $i_a(x,y)$ as the input (step 166). Thereafter, the output pixel value b(x,y) is rendered by the printer 20 in a conventional manner (step 158). Control advances to step 168 where it is determined if there are additional input pixels to be processed. If so, control returns to step 152 for additional input pixel halftoning in the manner previously described. When all input pixels have been rendered, the routine 150 ends at step 170.

The steps 156 and 166 are shown as being separate to facilitate an understanding of the present invention. However, it should be appreciated that steps 156 and 166 can be implemented as a single error diffusion routine, with either the input pixel value i(x,y) being error diffused, or the adjusted input pixel value $i_a(x,y)$ being error diffused.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A system for rendering an image representation, the system comprising:
   a halftone processor;
   a printer interfaced to the halftone processor; and
   software means operative on the halftone processor for:
   a) classifying an input pixel value in either a first classification or a second classification,
   b) determining an output pixel value by error diffusing the input pixel value when the input pixel value is classified in the first classification,
   c) determining a temporary output pixel value by stochastic screening the input pixel value when the input pixel value is classified in the second classification,
   d) determining an adjusted input pixel value based on the input pixel value, the temporary output pixel value and a weighting value,
   e) determining the output pixel value by error diffusing the adjusted input pixel value, and
   f) rendering the output pixel value in the printer.

2. The system of claim 1, wherein the weighting value is based on the input pixel value.

3. The system of claim 1, wherein the weighting value is a function of the input pixel value.

4. The system of claim 1, wherein the adjusted input pixel value $i_a(x,y)$ is determined from the equation:

$$i_a(x,y) = i(x,y) + a[b_1(x,y) - i(x,y)],$$

where $b_t(x,y)$ is the temporary output pixel value, and (a) is the weighting value.

5. The system of claim 1, wherein a) includes determining whether the input pixel value represents at least one of a highlight region and shadow region of the image representation.

6. The system of claim 1, wherein a) includes determining whether the input pixel value is a predetermined fraction of a predetermined value.

7. The system of claim 1, wherein a) includes determining whether the input pixel value is a predetermined fraction of 255.

8. A method for rendering an image representation, the method comprising:
   a) classifying an input pixel value in either a first classification or a second classification;
   b) determining an output pixel value by error diffusing the input pixel value when the input pixel value is classified in the first classification;
   c) determining a temporary output pixel value by stochastic screening the input pixel value when the input pixel value is classified in the second classification;
   d) determining an adjusted input pixel value based on the input pixel value, the temporary output pixel value and a weighting value;
   e) determining the output pixel value by error diffusing the adjusted input pixel value; and
   f) rendering the output pixel value.

9. The method of claim 8, wherein the weighting value is based on the input pixel value.

10. The method of claim 8, wherein the weighting value is a function of the input pixel value.

11. The method of claim 8, wherein the adjusted input pixel value $i_a(x,y)$ is determined from the equation:

$$i_a(x,y)=i(x,y)+a[b_t(x,y)-i(x,y)],$$

where $b_t(x,y)$ is the temporary output pixel value, and (a) is the weighting value.

12. The method of claim 8, wherein step a) includes determining whether the input pixel value represents at least one of a highlight region and shadow region of the image representation.

13. The method of claim 8, wherein step a) includes determining whether the input pixel value is a predetermined fraction of a predetermined value.

14. The method of claim 8, wherein step a) includes determining whether the input pixel value is a predetermined fraction of 255.

15. The method of claim 8, further including:
   g) repeating steps a)–f) for each pixel of the image representation.

16. A digital halftoning comprising:
   a processor;
   a marking device interfaced to the processor; and
   software means operative on the processor for generating an output pixel value to be rendered by the marking device, the output pixel value being generated by a stochastic screening routine, an error diffusion routine, or a selected combination of the stochastic screening routine and the error diffusion routine depending on an input pixel value:
   wherein the output pixel value is determined by the selected combination of the stochastic screening routine and the error diffusion routine when the input pixel value represents one of a highlight region and a shadow region of an image representation being rendered, and when the input pixel value is a predetermined fraction of 255.

17. The system of claim 16, wherein:
   a temporary output pixel value is produced by the stochastic screening routine,
   an adjusted input pixel value is determined based on the temporary output pixel value, and
   the adjusted input pixel value is error diffused to produce the output pixel value.

18. The system of claim 17, wherein the adjusted input pixel value $i_a(x,y)$ is determined from the equation:

$$i_a(x,y)=i(x,y)+a[b_t(x,y)-i(x,y)],$$

where $b_t(x,y)$ is the temporary output pixel value, and (a) is a weighting value.

19. The system of claim 18, wherein the weighting value is a function of the input pixel value.

* * * * *